United States Patent
Yamazaki et al.

(10) Patent No.: US 6,845,636 B2
(45) Date of Patent: Jan. 25, 2005

(54) APPARATUS FOR DEHYDRATING AND CONSOLIDATING AN OPTICAL FIBER PREFORM AND METHOD OF THE SAME

(75) Inventors: Takashi Yamazaki, Kanagawa (JP); Takashi Kogo, Kanagawa (JP); Yuichi Ohga, Kanagawa (JP); Tadashi Enomoto, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 101 days.

(21) Appl. No.: 09/943,418

(22) Filed: Aug. 31, 2001

(65) Prior Publication Data

US 2002/0029592 A1 Mar. 14, 2002

(30) Foreign Application Priority Data

Sep. 1, 2000 (JP) ........................................ 2000-265537

(51) Int. Cl.⁷ ............................................ C03B 37/012
(52) U.S. Cl. ............................ 65/426; 65/427; 65/424; 65/356; 65/374.15; 65/900
(58) Field of Search .......................... 65/424, 426, 427, 65/416, 422, 428, 488, 502, 507–509, 157, 162, 355–356, 900, DIG. 4, 413–414, 374.1, 374.15; 219/390, 637, 651; 432/206; 385/141–145

(56) References Cited

U.S. PATENT DOCUMENTS

| | | | |
|---|---|---|---|
| 3,626,154 A | * 12/1971 | Reed | ........................... 219/411 |
| 4,969,941 A | * 11/1990 | Kyoto et al. | ................... 65/391 |
| 5,106,401 A | * 4/1992 | Ishikawa et al. | ............... 65/398 |
| 5,114,338 A | * 5/1992 | Tsuchiya et al. | ............. 432/206 |
| 5,259,856 A | * 11/1993 | Ohga et al. | .................... 65/426 |
| 5,470,369 A | * 11/1995 | Tsuchiya et al. | ............... 65/379 |
| 6,543,257 B1 | * 4/2003 | Koaizawa et al. | ............. 65/489 |
| 2002/0005051 A1 | * 1/2002 | Brown et al. | .................. 65/414 |

FOREIGN PATENT DOCUMENTS

| | | | | |
|---|---|---|---|---|
| EP | 0 386 756 | * | 9/1990 | ......... C03B/37/029 |
| EP | 1 069 086 | * | 1/2001 | ......... C03B/37/014 |
| JP | 62-083418 | * | 4/1987 | ............ C21D/1/34 |
| JP | 64-76927 | | 3/1989 | |
| JP | 3-109228 | | 5/1991 | |
| JP | 6-127964 | | 5/1994 | |
| JP | 6-345469 | | 12/1994 | |

* cited by examiner

*Primary Examiner*—Peter Chin
*Assistant Examiner*—Eric Hug
(74) *Attorney, Agent, or Firm*—McDermott Will & Emery LLP

(57) ABSTRACT

A dehydration and consolidation furnace and a dehydration and consolidation method in which gas in a chamber does not leak to a furnace body room and gas in a furnace body room does not leak into a chamber is provided. A furnace of one embodiment of this invention has first muffle tube 3 and second muffle tube 4. The second muffle tube 4 is arranged coaxially around the first muffle tube 3. An optical fiber preform is arranged in this furnace. During the dehydration and consolidation process the pressure of the intermediate room 10 is set lower than a pressure inside the first muffle tube and outside the second muffle tube, and a gas supply and exhaust of the intermediate room 10 are performed independent of the gas supply and exhaust of the first muffle tube and a furnace body room.

4 Claims, 2 Drawing Sheets

APPARATUS FOR DEHYDRATING AND CONSOLIDATING AN OPTICAL FIBER PREFORM AND METHOD OF THE SAME

BACKGROUND OF THE INVENTION

1. Field of the Invention

This invention relates to an apparatus for dehydrating and consolidating a porous optical fiber preform and a method of the same.

2. Description of the Background Art

Vapor-phase Axial Deposition and Outside Vapor Deposition are known methods of making an optical fiber preform. In these methods, $SiCl_4$ and $GeCl_4$, and hydrogen and oxygen are supplied to a burner as source materials and as fuel respectively. $SiO_2$ particles are generated by flame hydrolysis reaction and deposited on a starting rod. A porous optical fiber preform made by these methods is successively heated in a furnace in order to be dehydrated and consolidated.

It is necessary to keep the heating atmosphere in the furnace exceptionally clean to obtain a transparent glass of sufficient purity. To accomplish this, a porous optical fiber preform is put in a muffle tube and separated from an insulation material that contaminates the atmosphere. The muffle tube is made of carbon or quartz.

Carbon is suitable for a muffle tube because it has an ability to match a bigger optical fiber preform as well as to withstand a rapid temperature change and high temperature equal to or more than 1600° C. in which a porous optical fiber preform is consolidated into a transparent glass blank. (For example, see Japanese patent application laid open No. 6-345469)

FIG. 2 shows a sectional view of a dehydration and consolidation furnace with a conventional muffle tube made of carbon.

An optical fiber preform 1 is hung at the central part of chamber 8 by a supporting rod 2, which penetrates through opening 3a of muffle tube 3 and opening 7a of furnace body 7. Muffle tube 3 is made of high purity carbon and constructed of muffle pieces, which are multistage-piled to cover a large-scale optical fiber preform. Packing made of carbon is applied on joints 3b of muffle tube 3, and the joints are sealed. Heater 5 and insulation member 6 are arranged in space 9 between muffle tube 3 and furnace body 7.

In chamber 8, gas for dehydrating and consolidating an optical fiber preform 1 is supplied through gas inlet 11 and drained through gas outlet 12. A mixture of helium and chlorine is used as this gas for example, (See Japanese patent application laid open No. 6-127964). In addition, furnace body 7 is provided with gas inlet 15 and gas outlet 16 and an inert gas, e.g., argon, is supplied to space 9 so as to prevent oxidation of heater 5 and the insulation material.

In a dehydration and consolidation furnace constituted as above, a sealing means is used between supporting rod 2 and openings 3a, 7a. The sealing portion at opening 7a can be gas tight where temperature is comparatively low, but the sealing portion at opening 3a cannot be gas tight where temperature is high. In addition, it is difficult for joints 3b to be completely gas tight even if they are sealed with carbon packing. Furthermore, connection portions of a gas inlet and a gas outlet with the muffle tube are not completely gas tight.

Chlorine gas for optical fiber preform processing reacts with water discharged from optical fiber preform 1 by heating, and a corrosive gas, e.g., HCl, is generated. If pressure in chamber 8 is greater than the outside, this corrosive gas leaks to the outside of muffle tube 3 through joints 3b and the sealing portion at opening 3a which are not completely gas tight. The corrosive gas that has leaked out into furnace body room 9 from chamber 8 corrodes furnace body 7 made of stainless steel alloy. In addition, there is a concern that this harmful gas may flow out through gas outlet 16 which is not connected to a harmful element remover.

Such a gas flow from chamber 8 into furnace body room 9 can be prevented by maintaining the pressure inside furnace body 7 higher than the pressure within muffle tube 3. However, in this case polluted gas generated from insulation material 6 leaks from furnace body room 9 to chamber 8, and a high purity transparent glass blank cannot be produced.

SUMMARY OF THE INVENTION

It is an object of the present invention to provide a dehydration and consolidation furnace and a dehydration and consolidation method in which gas in a chamber does not leak to a furnace body room and gas in a furnace body room does not leak into a chamber.

In order to achieve this object, a furnace that has a first muffle tube and a second muffle tube is provided. The second muffle tube is arranged coaxially around the first muffle tube. A gas inlet and gas outlet are equipped to the intermediate room formed between the first muffle tube and the second muffle tube.

A method of dehydrating and consolidating an optical fiber preform using this furnace is also provided. In this method, an optical fiber preform is arranged in this furnace. During the dehydration and consolidation process a pressure of the intermediate room is set lower than a pressure inside the first muffle tube and a pressure outside the second muffle tube, and a gas supply and exhaust of the intermediate room are performed independent of the gas supply and exhaust of the first muffle tube and the furnace body room.

The above and further objects and novel features of the invention will be more fully clarified from the following detailed description when the same is read in connection with the accompanying drawings. It is to be expressly understood, however, that the drawings are for the purpose of illustration only and are not intended as a definition of the limits of the invention.

DESCRIPTION OF THE PREFERRED EMBODIMENT

Figure 1:
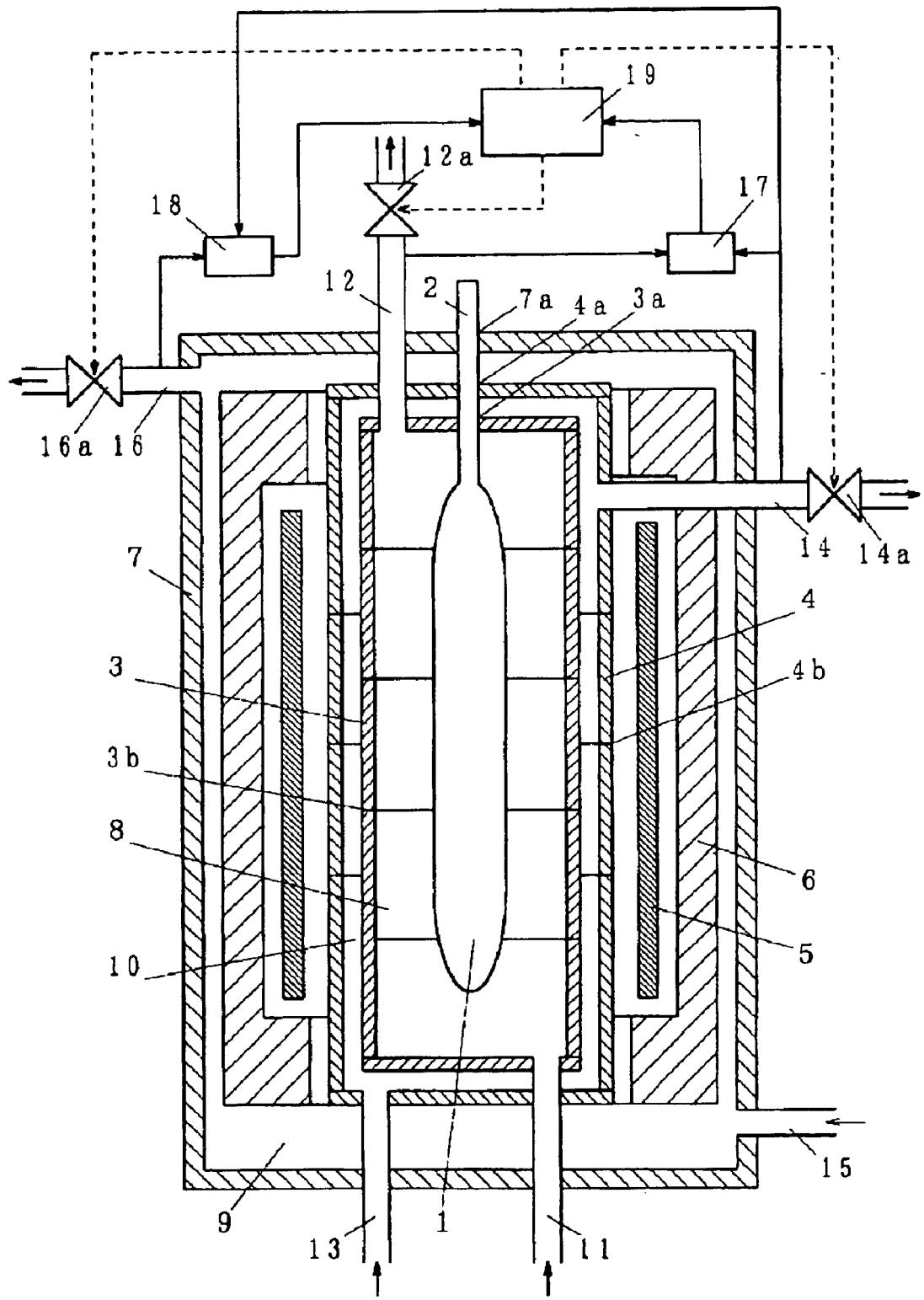
FIG. 1 is a sectional view indicating one embodiment of a dehydration and consolidation furnace of this invention.

In the following, preferred embodiments of the present invention will be explained in detail with reference to the accompanying drawings. To facilitate the comprehension of the explanation, the same reference numerals denote the same parts, where possible, throughout the drawings, and a repeated explanation will be omitted. The dimensions in the drawings are partly exaggerated and do not always correspond to actual ratios of dimensions.

Referring to FIG. 1 one embodiment of this invention is explained. The furnace of this invention has second muffle tube 4 arranged coaxially around the muffle tube 3

(hereinafter called first muffle tube) of the conventional furnace shown in FIG. 2, and a space 10 (hereinafter called intermediate room) is made between first muffle tube 3 and second muffle tube 4, and gas inlet 13 and gas outlet 14 are equipped to intermediate room 10.

Both first muffle tube 3 and second muffle tube 4 are made of high purity carbon. They are constructed of muffle pieces, a cover member and a bottom member. The muffle pieces are piled up to form a hollow cylinder. The cover member and the bottom member are attached to the upside and downside of the hollow cylinder, respectively. The cover member and the bottom member may be unified with a muffle piece. Thin packing made of carbon is used at joints 3b and 4b between these members and joints 3b and 4b are sealed. But it is difficult to make joints 3b and 4b completely gas tight.

An optical fiber preform is hung at the center of chamber 8 by a supporting rod 2 which penetrates through opening 3a of first muffle tube 3, opening 4a of second muffle tube 4 and opening 7a of furnace body 7. At opening 7a sealing can be made gas tight using a heat-resistant sealing member of fluorine-containing rubber, but at openings 3a, 4a sealing is inadequate because a carbon packing is used.

Heater 5 is arranged around second muffle tube 4 and covered with an insulation material 6 so that thermal radiation to the outside is prevented. Furnace body 7 is made of corrosion resistance metal, e.g., stainless steel, and covers all elements including first muffle tube 3 and second muffle tube 4, completely encapsulating them from the outside.

Figure 2:
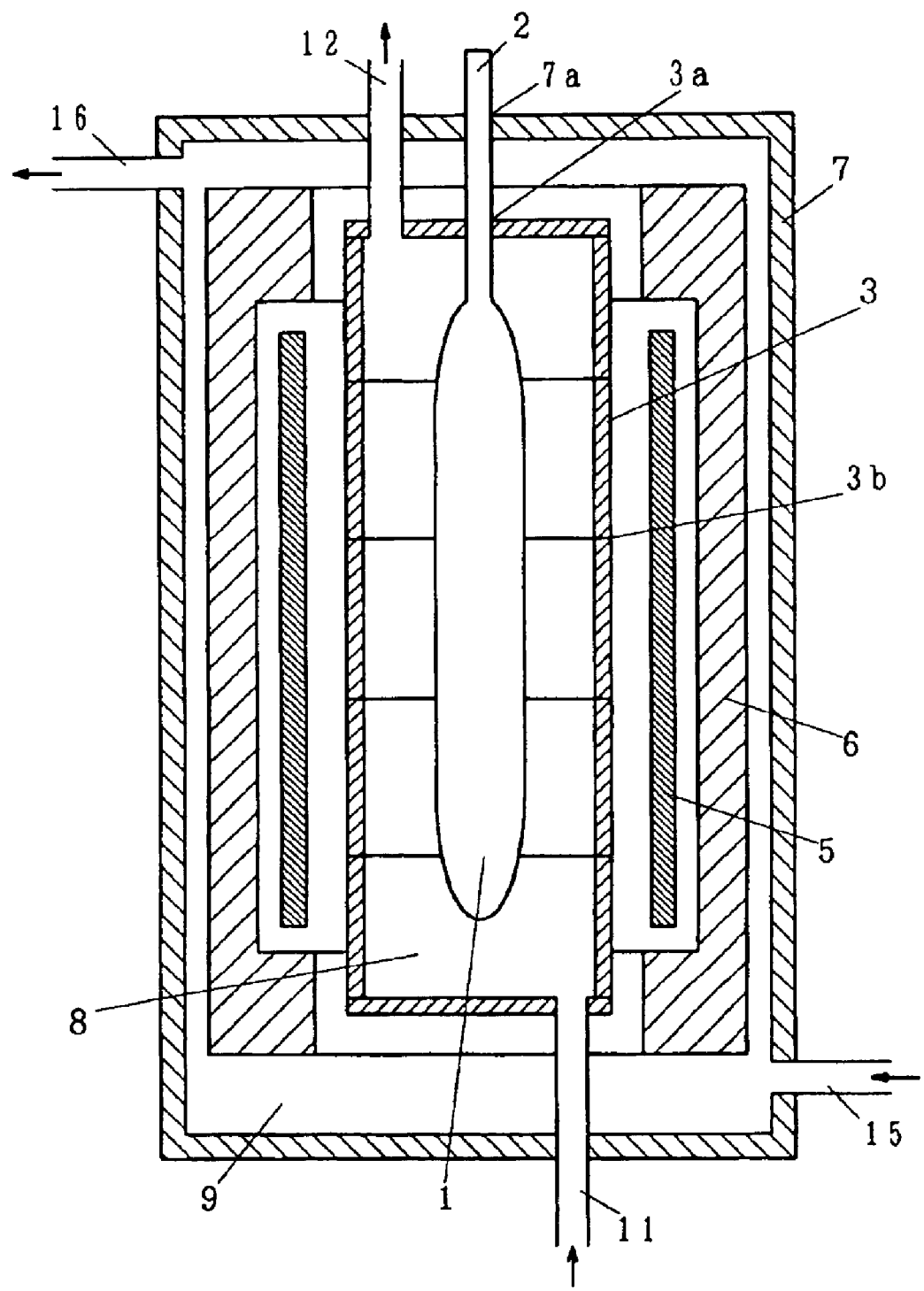
FIG. 2 is a sectional view indicating a conventional dehydration and consolidation furnace.

To chamber 8, which is the space inside first muffle tube 3, gas used for the dehydration and consolidation process of an optical fiber preform 1 is supplied through gas inlet 11 similar to the case of FIG. 2 as explained previously. For example, a mixed gas of helium that is suitable for consolidation of glass, and chlorine that is suitable for dehydration processing is supplied. In addition, fluorine compound gas resolving at a high temperature may be supplied for refractive index adjustment of an optical fiber preform. Supplied gas is not limited to these gases, and various gases are used in the production process of an optical fiber preform.

Some part of supplied gas generates harmful and corrosive gas such as hydrogen chloride or hydrogen fluoride as a result of hydrolysis due to water discharged from the optical fiber preform 1. These gases are exhausted through gas outlet 12.

In addition, an inert gas, e.g., argon, is supplied through gas inlet 15 to furnace body room 9 which is the space between furnace body 7 and second muffle tube 4, so as to prevent heater 5 and insulation material 6 from deterioration by oxidation. Gas outlet 16 is also arranged to drain this inert gas.

Intermediate room 10 is arranged between chamber 8 and furnace body room 9. Helium, for example is supplied to this intermediate room 10 through gas inlet 13 and drained through gas outlet 14. The pressure of intermediate room 10 is adjusted to a pressure lower than the pressure of chamber 8 and the pressure of furnace body room 9.

When the pressure of intermediate room 10 is set lower than the pressure of chamber 8, gas in chamber 8 leaks to intermediate room 10 to some extent through opening 3a and joints 3b which are not completely gas tight. However, the gas that leaks to intermediate room 10 is drained through gas outlet 14. In addition, gas in intermediate room 10 does not leak into chamber 8 where the pressure is higher.

The pressure of intermediate room 10 is also set lower than the pressure of furnace body room 9. Even if gas in furnace body room 9 leaks to some extent through opening 4a or joints 4b of second muffle tube 4 into intermediate room 10, this gas is drained through gas outlet 14. In addition, the gas in intermediate room 10 does not leak to furnace body room 9 where the pressure is higher.

In other words, corrosive and harmful gases generated in chamber 8 do not leak to furnace body room 9 even if they leak to intermediate room 10. Similarly, gas polluted with the insulation material in furnace body 7 does not leak to chamber 8 even if they leak to intermediate room 10. Therefore, even if joints and openings at first muffle tube 3 and second muffle tube 4 which separate the gas in chamber 8 and the gas in furnace body room 9 are not completely gas tight, the gases are prevented from leaking into each other.

Thus, according to the present invention, a large-scale muffle tube can be constructed by divisional structure and processing of a large-scale optical fiber preform is enabled because it is unnecessary to make the encapsulation structure of the muffle tubes completely gas tight. In addition, the life of a furnace body can be prolonged because there is no leakage of corrosive gas from a muffle tube. Furthermore, high purity consolidated glass can be obtained, because polluted gas in the furnace body room does not leak into the muffle tube.

The pressure differences between intermediate room 10 and chamber 8 and between intermediate room 10 and furnace body room 9 can be small to prevent gas flows from intermediate room 10 to chamber 8 or intermediate room 10 to furnace body room 9. As exemplification, dehydration and consolidation of an optical fiber preform was performed in a state in which the pressure P of intermediate room 10 was set in a range of 101.3–102.3 kPa (here the atmospheric pressure was 101.33 kPa), the pressure of chamber 8 was set in a range of P+0.01–P+0.2 kPa, and the pressure of furnace body room 9 was set in a range of P+0.1–P+1.0 kPa. No gas flow whatsoever was detected between chamber 8 and furnace body room 9. In addition, it was possible to adjust a refractive index of an optical fiber preform by fluorine compound gas that resolved at a high temperature and a desired refractive index profile could be obtained.

In addition, the pressure adjustment of chamber 8, furnace body room 9 and the intermediate room 10 can be controlled with exhaust valves 12a, 14a and 16a provided at gas outlets 12, 14 and 16. When the pressure is automatically adjusted, remote controllable electric valves are used as exhaust valves 12a, 14a and 16a.

The pressure difference between chamber 8 and intermediate room 10 is detected with differential pressure gauge 17 and exhaust valve 12a of gas outlet 12 is operated by gas pressure control unit 19 thereby the pressure of chamber 8 is adjusted. The pressure difference between furnace body room 9 and intermediate room 10 is detected with differential pressure gauge 18 and exhaust valve 16a of gas outlet 16 is operated by gas pressure control unit 19 thereby and the pressure of furnace body room 9 is adjusted.

In addition, while this invention was explained in the embodiment in which a muffle tube was made of carbon, this invention also applies to a case where a muffle tube is constituted by a division structure of quartz.

What is claimed is:

1. An apparatus for dehydrating and consolidating an optical fiber preform, comprising:
    a first muffle tube having a first hollow cylinder, a first cover member, and a first bottom member,
    a second muffle tube having a second hollow cylinder, a second cover member, and a second bottom member and is arranged coaxially around said first muffle tube such that an intermediate room is formed therebetween, means for supplying gas to said intermediate room;

means for exhausting gas from said intermediate room; and a furnace body surrounding said first and second muffle, wherein the whole circumference of said first muffle tube is surrounded by said second muffle tube.

2. An apparatus for dehydrating and consolidating an optical fiber preform according to claim 1, wherein said first muffle tube and said second muffle tube are formed of a plurality of muffle pieces piled up.

3. An apparatus for dehydrating and consolidating an optical fiber preform according to claim 1, wherein said first muffle tube and said second muffle tube are made of carbon.

4. A method of dehydrating and consolidating an optical fiber preform, comprising:

arranging said optical fiber preform in a dehydration and consolidation furnace having a first muffle tube constructed of a first hollow cylinder, a first cover member, and a first bottom member and a second muffle tube constructed of a second hollow cylinder, a second cover member, and a second bottom member, which are arranged coaxially in a furnace body such that the whole circumference of said first muffle tube is surrounded by said second muffle tube and an intermediate room is formed therebetween;

maintaining the pressure of an intermediate room formed between said first muffle tube and said second muffle tubes to be lower than both a pressure in said first muffle tube and a pressure outside said second muffle tube; and performing a gas supply and exhaust of said intermediate room independent of the gas supply and exhaust of the first muffle tube and a furnace body room.

* * * * *